2,772,171
Patented Nov. 27, 1956

2,772,171
METHOD OF PACKAGING CAKE MIX AND FROSTING THEREFOR

Henry P. Montminy, Arlington, Mass.

No Drawing. Application October 17, 1955,
Serial No. 541,068

1 Claim. (Cl. 99—172)

This invention relates to a package cake mix with a companion frosting.

For many years prepared cake mixes were available as an individual cake mix in a package. However, these cake mixes were not popular and never could they make inroads with the consumer because such mixes would produce a cake inferior to that made in the home; furthermore they were without the inclusion of a frosting mix to complete the finishing of the cake before serving.

These type mixes I find were mostly made with the use of dehydrated eggs and milk powder, artificial coloring and flavoring which are not necessarily a quality to produce quality cake such as that to which the American housewife is accustomed. Selection of ingredients such as the shortening and flour governs to a great extent the shelf life of the mix. Although the chemical integrity of dried eggs and milk may not be appreciably impaired, each is incapable of regaining the physical properties of the original product which determine to a great extent the final eating quality of the finished cake. Consequently, it is impossible to produce a cake having the same fluffiness or lightness, grain and texture, and the desirable eating quality and other characteristics which are possessed by a cake made in the home in accordance with conventional practices. Prepared icing mixes are subject to the same disadvantages if the proper selection of ingredients and the proper proportions have not been made.

Therefore, in developing a complete cake mix with a companion icing, first of all only the best high quality ingredients can be used if the cake and icing are to be comparable in quality to that made in the home. A high grade cake flour capable of carrying a high percentage of sugar and liquid milk must be used. An emulsifier type shortening having high emulsifying properties capable of absorbing a high percentage of sugar and liquid must be used to insure the utmost in eating quality. A shortening having a high degree of rancidity resistance is likewise required to insure the necessary and proper shelf life of the package cake mix and frosting as well. Proper selection of leavening agent, such as baking powder, and proper selection of the right type of sugar, whether it is the fine granulated sugar for the cake mix or the extra fine powdered sugar for the frosting mix.

The principal objects of the present invention are to overcome the objectional features inherent in prepared cake and icing mixes and to provide a composite package of cake mix companion icing, both of which have a long shelf life and merely require the addition of certain ingredients in order to produce a frosted cake comparable in all respects to one produced in accordance with home practices.

Further objects will be apparent from the consideration of the following disclosure wherein I have set forth examples of typical formulations and procedures.

In accordance with the present invention the basic cake mix consists essentially of flour, shortening and sugar with minor amounts of salt and baking powder, which may be packaged and stored indefinitely without danger of deterioration, and to which it is merely necessary to add milk and fresh shell eggs, together with a selected flavoring, in order to produce a cake having all the desired qualities of one produced by the homemaker. Although the proportion of ingredients may be varied, a highly successful basic cake mix may consist essentially of approximately 5 to 8 parts of an emulsifier type shortening, dispersed in a mixture of approximately 10 parts cake flour, from 12 to 17 parts granulated sugar, and approximately 1 part of a salt-baking powder mixture. The companion icing consists essentially of a major portion of sugar and a minor portion of shortening and salt, with or without cocoa or the like. Some variation in the proportion of ingredients may be tolerated, but apart from flavoring ingredients a satisfactory basic mixture may consist essentially of approximately 1 to 2 parts of a bland shortening dispersed in 7 to 9 parts of powdered sugar. This basic mix not only has a long "shelf life" but furthermore merely requires addition of milk and butter in order to produce a high quality icing at least as good as that produced by conventional practices.

A shortening suitable for the cake mix, hereinafter referred to as Shortening A, consists essentially of either a hydrogenated vegetable oil, or a mixture of a hydrogenated vegetable oil and an animal fat, containing from about 3% to 5% mono- and diglycerides. A shortening suitable for the frosting or icing, hereinafter referred to as Shortening B, consists essentially of a hydrogenated vegetable oil of bland flavor and odor.

The proportion of flour and/or sugar to shortening is of considerable importance both in the cake mix and the icing. In the case of the cake mix the amount of sugar preferably exceeds the amount of flour and the ratio of the combined sugar and flour to shortening may vary from 3:1 to about 5:1, depending upon the particular type of cake to be made. Likewise with the icing, where the ratio of sugar to shortening may vary from approximately 5:1 to 12:1, depending upon the particular type of icing. Both the cake and icing mixes are in the form of a uniform dry dispersion of shortening in flour and/or sugar, and since the particles of shortening are in effect enveloped by the flour and/or sugar, they are effectively sealed against oxidation. Since each of the mixes is free from fats and proteinaceous ingredients that are readily susceptible to oxidative rancidity and putrefaction, there is little, if any, danger of undergoing deterioration. Moreover, the basic formulation of both mixes merely requires the addition of ingredients that are always at hand in the home, namely eggs, milk and butter, none of which finds its counterpart in a dehydrated form or a synthetic equivalent.

Illustrative formulations and typical procedures are set forth in the following examples:

EXAMPLE I

Yellow cake mix

| | |
|---|---|
| Cake flour | pounds __ 10 |
| Granulated sugar | do ____ 13 |
| Shortening A | do ____ 5 |
| Baking powder | ounces __ 10 |
| Salt | do ____ 5 |

The above ingredients were placed in a 30 quart bowl equipped with a paddle and mixed until they were uniformly blended. The resulting mixture was then scaled into waxed paper bags at 1 pound 2 ounces per package.

Fudge frosting mix

| | |
|---|---|
| 6X sugar | pounds __ 10 |
| Shortening B | do ____ 2 |
| Cocoa | do ____ 2.5 |
| Salt | ounces __ 0.25 |

These ingredients were mixed at low speed for approximately five minutes which is sufficient to break the shortening into fine particles, and the mixture was then sealed into waxed paper bags at 10 ounces per package.

A package of the yellow cake mix and the fudge frosting mix were placed in fiber board containers and set aside for testing. After a period of over 12 months neither mix had undergone perceptible deterioration.

A frosted cake is prepared from the above mixes in the following manner:

The contents of one package of cake mix is placed in a mixing bowl to which one half cup of milk and one teaspoon of vanilla is added, the milk and vanilla first being stirred in and then beaten until smooth. This usually requires about two minutes or 300 strokes. Two eggs are mixed with a quarter cup of milk and the mixture is added to the batch in two equal portions, beating until smooth after each addition. This second mixing usually requires about one minute or 150 strokes for each portion. The resulting batter is evenly divided in two greased and flour-dusted 8-inch layer pans and baked in a preheated oven at 390° F. for 20 to 25 minutes. If desired, the batter may be poured into a greased and flour-dusted 10 x 10 x 2 inch or an 8 x 12 x 2 inch pan and baked at 375° F. for 40 to 45 minutes.

The companion icing is prepared by placing the contents of the 10 ounce package into a mixing bowl to which is added a mixture of a quarter cup of milk and a teaspoon of butter which has been heated to the boiling point. The mix is then beaten until smooth, after which a half teaspoon of vanilla is added. The amount of frosting thus prepared is sufficient for the filling and top of two 8-inch layers, or for the top of a 10 x 10-inch or 8 x 12-inch cake.

EXAMPLE II

White cake mix

| | | |
|---|---|---|
| Cake flour | pounds | 10 |
| Granulated sugar | do | 12.25 |
| Shortening A | do | 5 |
| Baking powder | ounces | 10 |
| Salt | do | 5 |
| Cream of tartar | do | 1 |

The above ingredients were mixed and packaged in the manner set forth in Example I.

White fudge frosting

| | | |
|---|---|---|
| 6X sugar | pounds | 9 |
| Shortening B | ounces | 12 |
| Salt | do | 0.25 |

These ingredients were also mixed and packaged in the manner above described and a one pound two ounce package of the cake mix and a ten ounce package of the frosting mix were placed in fiberboard containers and set aside for testing. After a period of over 12 months no perceptible deterioration of either mix was noted.

A frosted cake is prepared from these mixes in the following manner: The contents of the cake mix is placed in a mixing bowl to which is added a mixture of one-half cup of milk, one-quarter teaspoon of lemon extract and one-eighth teaspoon of almond extract, the mixture being stirred in and then beaten until smooth. A separately prepared mixture of the whites of four eggs in a quarter cup of milk is added to the batter in two equal portions, beating until smooth after each addition. The batter is then transferred to greased and flour-dusted pans and baked at 350° F.–375° F. for a period depending on the size of the baking pan.

The companion icing is prepared by placing the contents of the mix in a bowl to which is added two tablespoons of milk and one tablespoon of butter previously heated to boiling, the mixture being beaten until smooth. Thereafter a half teaspoon of vanilla may be added, and if a cherry fudge frosting is desired three finely cut maraschino cherries may be mixed into the frosting.

EXAMPLE III

Fudge cake mix

| | | |
|---|---|---|
| Cake flour | pounds | 10 |
| Granulated sugar | do | 17 |
| Shortening A | do | 7.5 |
| Cocoa | do | 4.75 |
| Baking powder | ounces | 7 |
| Salt | do | 6 |
| Soda | do | 2 |

The above ingredients were mixed as in the preceding examples and scaled into waxed paper bags at one pound two ounces per package.

Fudge frosting

| | | |
|---|---|---|
| 6X sugar | pounds | 7 |
| Shortening B | do | 1 |
| Cocoa | ounces | 11 |
| Salt | do | 0.25 |

These ingredients were mixed as in the preceding examples and scaled into waxed paper bags at ten ounces per package. The packaged cake mix and companion frosting were then placed in fiberboard containers and set aside for testing. After a period of over 12 months no perceptible deterioration had taken place.

In preparing a frosted cake from the above, the cake mix is placed in a bowl to which is added one-half cup of milk and one teaspoon of vanilla, the mixture being beaten until smooth. Two eggs in a half cup of milk is added in two equal portions, beating until smooth after each addition. The batter is then poured in one or more greased and flour-dusted pans and baked at 350° F. for forty to forty-five minutes, or 380° F. for twenty to twenty-five minutes.

The companion icing is prepared by placing the contents of frosting mix in a bowl to which is added a mixture of three tablespoons of milk and three tablespoons of butter heated to boiling. The mixture is then beaten until smooth, after which a half teaspoon of vanilla is mixed in well, followed by a quarter cup of finely chopped pecans which are thoroughly mixed into the frosting.

It will be noted from the foregoing that the basic cake mix consists essentially of a major portion of flour and sugar, and a minor portion of shortening dispersed in the flour-sugar mixture along with small amounts of baking powder, salt, etc.; and the basic icing mix consists essentially of a major portion of sugar and a minor portion of shortening dispersed in the sugar. To complete the cake mix it is merely necessary to add milk and eggs along with the desired flavor, and the icing is completed by the addition of milk and butter along with a selected flavor. Since the basic cake and icing mixes are packed in the same container, the user does not have the problem of trying to guess how much frosting should be prepared. By following the directions setting forth the number of eggs and amount of milk and butter to be added, the user is assured of a properly balanced recipe.

This manner of making cake and frosting eliminates the measuring and sifting of flour, measuring shortening, sugar, baking powder and salt; the latter two ingredients being delicate in their nature can cause poor results or complete failure if the slightest mistake is made.

A further advantage is that the essential ingredients to be added to the basic mix are milk, eggs and butter which are generally at hand and nothing other than the conventional mixing bowl, measuring cup, table and teaspoons are used in preparing the batter and frosting. Hence, simplicity of mixing and a substantial saving in time is achieved.

By combining the cake mix and frosting mix into one package it not only reduces the cost of packaging substantially, but also reduces shelf space in the store as well as in the home.

While I have disclosed typical examples illustrative of my new basic cake mix and companion icing, it is to be understood that various modifications in the basic formulations may be made without departing from the spirit and scope of the invention.

I claim:

The method of preparing a packaged cake mix and frosting therefor including separate packages of cake mix and frosting mix combined in a single outer container, whereby the consumer may add milk, fresh shell eggs, and selected flavoring in desired proportions to said cake mix to produce a resulting cake mixture suitable for baking, and whereby said consumer may add milk, butter and selected flavoring in desired proportions to said frosting mix to produce a suitable frosting for a baked cake product, comprising the steps of mixing together approximately 5 to 8 parts of an emulsifier type of shortening, approximately 10 parts of cake flour, approximately 12 to 17 parts of granulated sugar and approximately 1 part salt-baking powder mixture to produce a cake mix, inserting said cake mix in a container to provide a first package, mixing together approximately 1 to 2 parts of a bland shortening and approximately 7 to 9 parts of powdered sugar to produce a frosting mix, inserting said frosting mix in another container to provide a second package, and enclosing said first and second packages in said outer container.

References Cited in the file of this patent

UNITED STATES PATENTS

| | | |
|---|---|---|
| 1,889,882 | Woods | Dec. 6, 1932 |
| 1,983,685 | Townsley | Dec. 11, 1934 |
| 2,096,825 | Roman | Oct. 26, 1937 |
| 2,424,536 | Mayer et al. | July 22, 1947 |
| 2,469,204 | Peters | May 3, 1949 |